United States Patent [19]
Ziegler

[11] Patent Number: 5,533,619
[45] Date of Patent: Jul. 9, 1996

[54] CONTAINER FOR A MAGNETIC TAPE CASSETTE

[75] Inventor: Christiane Ziegler, Waldachtal, Germany

[73] Assignee: fischerwerks Artur Ficher GmbH & Co., Waldachtal, Germany

[21] Appl. No.: 335,152

[22] Filed: Nov. 7, 1994

[30] Foreign Application Priority Data

Nov. 19, 1993 [DE] Germany .............................. 9317730 U

[51] Int. Cl.$^6$ ................................................. B65D 85/672
[52] U.S. Cl. .................................. 206/387.12; 206/387.1; 312/9.57
[58] Field of Search ............................ 206/387.1, 387.12; 312/9.47, 9.48, 9.57

[56] References Cited

FOREIGN PATENT DOCUMENTS

| | | |
|---|---|---|
| 0323437 | 3/1983 | European Pat. Off. . |
| 3719797 | 12/1988 | Germany . |
| 3840903 | 6/1990 | Germany . |
| 4039954 | 6/1992 | Germany . |
| 9210640 | 8/1992 | Germany . |

*Primary Examiner*—David T. Fidei
*Attorney, Agent, or Firm*—Michael J. Striker

[57] ABSTRACT

The container for magnetic tape cassettes includes a housing (1) and a slider (2) for a magnetic tape cassette. The housing (1) has a spring-loaded mechanism for partially displacing the slider out of the housing (1) into a removal position and the slider can be locked in the housing in a storage position. The slider has a base plate (5) including a non-pivotable rear base plate (23) and a pivotable part (3) having a transverse pivot axis (4) arranged above and spaced from the base plate (5). The slider is provided with a gap (21) in the base plate (5) which is located between the pivotable part (3) and the non-pivotable rear base plate (23). The device for pivoting the pivotable part (3) downward about the transverse pivot axis (4) includes a peg (9,10) spaced from and below the pivot axis (4) on each side of the slider (2) and guide cams (11,12) on opposite sides of the housing which guide the motions of the pegs so that, when the slider is urged into the removal position, the pegs (9,10) engage on stops (13) of the guide cams (11,12) so that the pivotable part (3) of the slider (2) pivots downward. Because of the gap (21) in the base plate (5) more space is provided for removal of the magnetic tape cassette in the removal position.

5 Claims, 4 Drawing Sheets

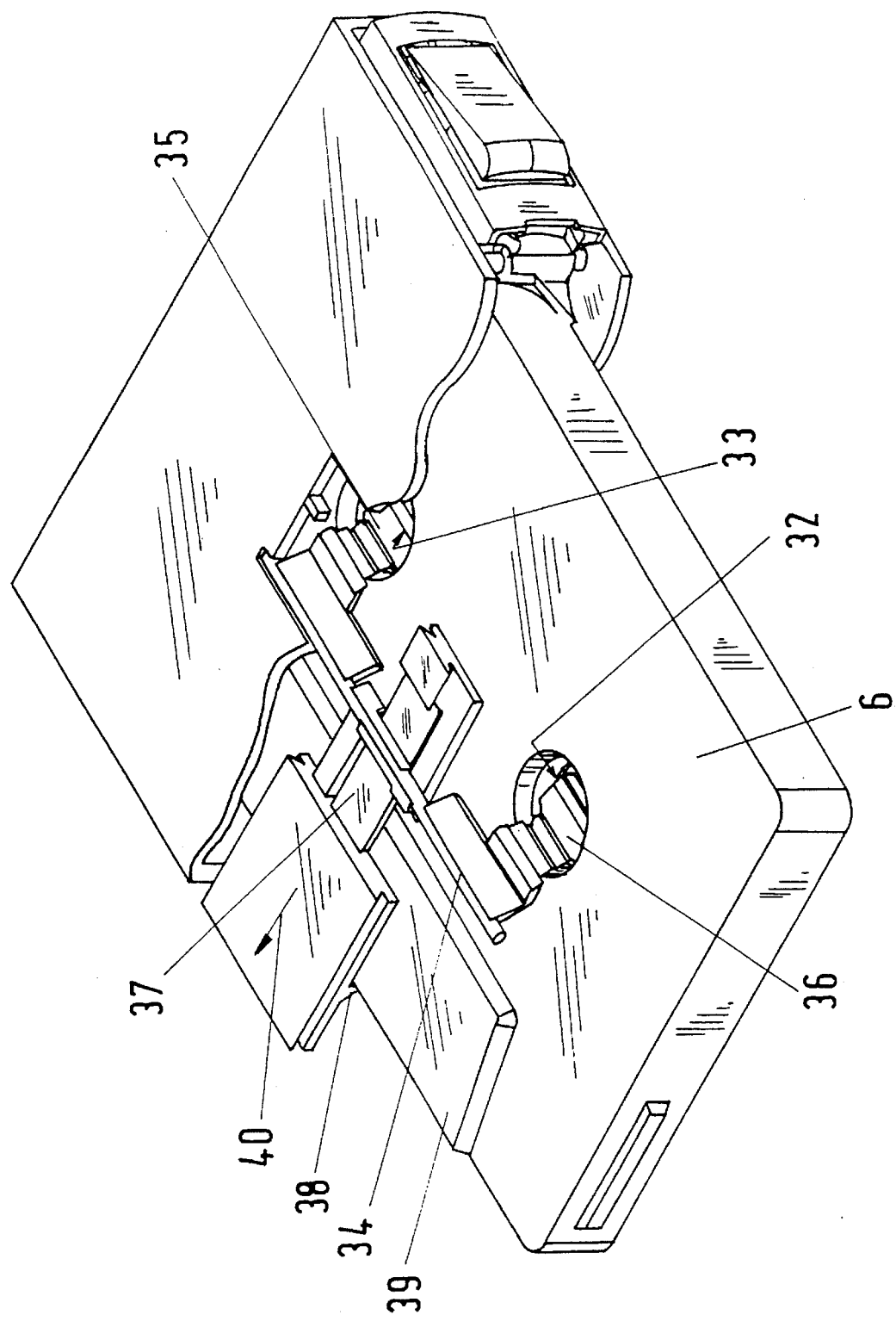

5,533,619

CONTAINER FOR A MAGNETIC TAPE CASSETTE

BACKGROUND OF THE INVENTION

The present invention relates to a container for a magnetic tape cassette.

A container for a magnetic tape cassette is known comprising a housing and a slider accommodating a magnetic tape cassette. The slider is arranged to be locked in the housing in a storage position and is partially displaceable out of the housing into a removal position. The part of the slider projecting from the housing in the removal position is pivotable downwards about a horizontal pivot axis when the housing is horizontally oriented, i.e. the horizontal pivot axis is a transverse pivot axis which passes through the slider perpendicular to the insertion direction of the magnetic tape cassette.

European Patent Document EP 0 323 437 B1 describes containers for storing magnetic tape cassettes, each of which has a slider insertable in a housing, on which a magnetic tape cassette to be stored can be placed. The containers can be assembled using joining elements to form a block comprising several containers. It is also possible to insert several containers one above the other or side by side into a common holder which can be mounted in a suitable recess in the dashboard or on a console in a motor vehicle. A holder having several sliders arranged one above the other is disclosed in German Published Patent Application DE 40 39 954 A1.

Because these containers are used, in particular, for storing magnetic tape cassettes in motor vehicles, it is especially important for careful handling that the removal and insertion of the magnetic tape cassette be as easy as possible. For that purpose, in the removal position, in which the magnetic tape cassette projects slightly from the housing, the front part of the slider located beneath the magnetic tape cassette can pivot downwards to allow the best possible access to the magnetic tape cassette.

SUMMARY OF THE INVENTION

It is an object of the present invention to provide a container for a magnetic tape cassette which guarantees very easy and reliable handling when a magnetic tape cassette is being removed and/or reinserted.

This object and others which will be made more apparent hereinafter are attained in a container for a magnetic tape cassette comprising a housing and a slider with means for accommodating a magnetic tape cassette. The slider can be locked in the housing in a storage position. Means for displacing the slider partially out of the housing into a removal position are provided. The portion of the slider projecting from the housing in the removal position is pivotable downwards about a transverse pivot axis which passes through the slider perpendicularly to the insertion and removal direction of the slider.

According to the invention in the storage position a gap is provided in the base plate of the slider, which is located between the pivotable part and the non-pivotable rear base plate. The portion of the slider which pivots downward has a pivot axis arranged above and spaced from the base plate.

Because there is a space in the base plate located between the non-pivotable and the pivotable part of the slider, a gap running transversely to the insertion direction of the magnetic tape cassette is provided in the base plate in the vicinity of the pivot axis, which enables the pivotable part of the slider to be pivoted comparatively further down in the removal position to provide a larger free space around the magnetic tape cassette that is projecting from the housing. The magnetic tape cassette can thus be gripped especially easily and at any point and removed from the container.

In preferred embodiments of the invention a peg is provided projecting outwards from each side of the pivotable part of the slider. Each peg provided engages in respective associated guide cams on opposite sides of the housing. As the slider is pushed out of the housing, the pegs are guided in the guide cams as far as a stop, so that the peg spaced from the pivot axis of the slider is restrained by this stop and the pivotable part of the slider is consequently pivoted downwards by the force of a compression spring. The compression spring can be arranged in the rear part of the housing as part of the means for partially displacing the slider from the housing and presses the slider into the removal position by its spring force. No separate spring is therefore required to pivot the pivotable part downward. On the contrary, the spring force of the compression spring provided for actuation of the slider is used.

Since the magnetic tape cassette containers of this type are used in particular in motor vehicles, it is especially advantageous if the pivotable part of the slider is constrained to pivot downwards into the removal position and, at the same time, means guarding against excessive pressure on the peg or pivotable part is provided. If the pivotable slider part is unintentionally pressed too hard, the means guarding against too excessive pressure prevents the breaking off of the pegs from the slider. For that purpose, the pegs have inclined ramp faces which allow the pegs to yield inwards into the housing, if the front part of the slider is pressed too hard, so that the pegs no longer are adjacent to the stop of the guide cam. The pegs are therefore reliably prevented from breaking off, even when the container is handled clumsily.

Furthermore, to improve handling in other embodiments a first light guide is provided adjacent to the slider in the housing. This first light guide extends to a second light guide arranged in the pivotable part of the slider. When the container is open, the end face of the light guide located in the housing radiates light freely forwards, so that the insertion opening is clearly recognizable, even in darkness.

The light guide arranged in the pivotable part of the slider leads to a container-empty indicator which is rotatable about a vertical axis and is irradiated on the visible side by the light guide. To operate the container-empty indicator, a rotating element projecting into the receiving space of the slider is provided on the container-empty indicator and is rotated by a magnetic tape cassette on the slider through about 45° against the force of a restoring spring. A visible marking on the container-empty indicator, which, if desired, indicates the empty state of the slider, is visible particularly well in darkness as a result of the illumination from outside, thus optimizing handling even further.

Locking elements for the tape hubs are likewise arranged in the housing of the container to prevent disturbing rattling noises and to prevent the reels of an inserted magnetic tape cassette from rotating unintentionally.

The container of the invention is suitable both for transverse insertion and for longitudinal insertion of magnetic tape cassettes or similar recording media. The front part of the slider which can be pivoted comparatively further downward than the front part of the prior art slider structures provides great advantages, in particularly in a structure designed for transverse insertion, because in that case the slider has a much smaller built-in depth than in an embodiment designed for longitudinal insertion. The relatively small built-in depth necessarily means that the pivotable part of the slider has a small built-in depth, so that this part of the slider should be able to pivot as far down as possible to allow the transversely arranged magnetic tape cassette to be gripped with as little difficulty as possible.

BRIEF DESCRIPTION OF THE DRAWING

The objects, features and advantages of the present invention will now be illustrated in more detail by the following detailed description, reference being made to the accompanying drawing in which:

FIG. 4 is a cutaway perspective view of the housing of the container of FIG. 1 showing the arrangement of the locking elements for the tape hubs.

DESCRIPTION OF THE PREFERRED EMBODIMENT

Figure 1:
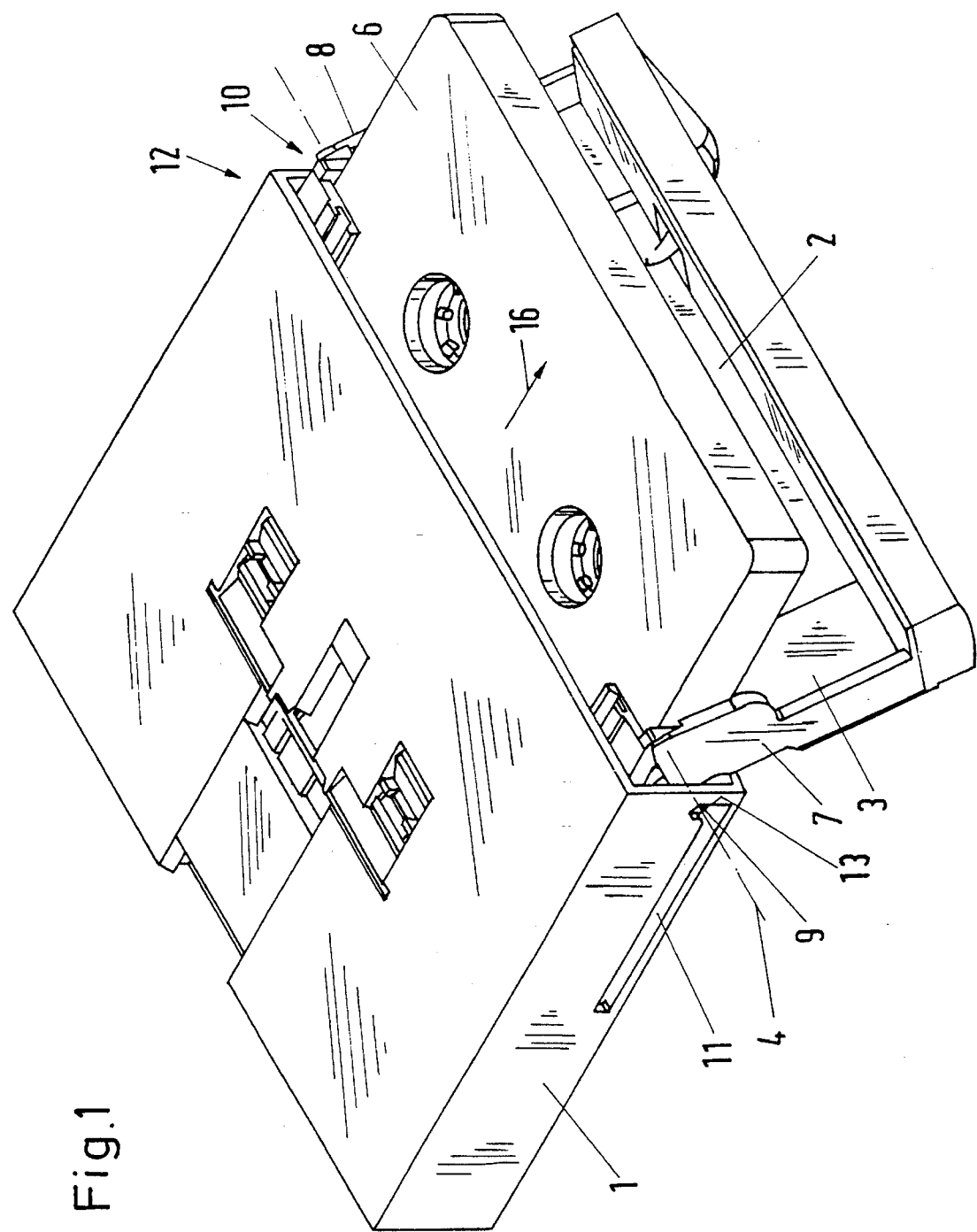
FIG. 1 is a perspective view of a container for a magnetic tape cassette according to the invention in which the slider is in the opened removal position.

The container illustrated in FIG. 1 consists of a housing 1 and a slider 2, of which here in particular the front, pivotable part 3 of the slider is visible. The pivotable part 3 is pivoted downwards about a transverse pivot axis 4 (which is perpendicular to the insertion direction of the magnetic tape cassette or to the direction of the arrow 16) into a removal position. In this removal position, a magnetic tape cassette 6 on the base plate 5 (FIG. 3) of the slider 2 can easily be removed by hand from the housing 1.

Pegs 9, 10, which engage in guide cams 11, 12 formed laterally in opposite sides the housing 1, project outwardly from both sides 7, 8 of the part 3 and are spaced at a distance from the transverse pivot axis 4. Because the peg 10 and the guide cam 12 are not visible in FIG. 1, their positions have been indicated by position arrows 10, 12.

In the removal position, the peg 9 presses against a stop 13 of the guide cam 11. A compression spring 15 acting on the rear side 14 (FIG. 3) of the slider 2 presses the slider 2 forwards in the direction of arrow 16, the opposite of the insertion direction of the magnetic tape cassette.

Figure 2:
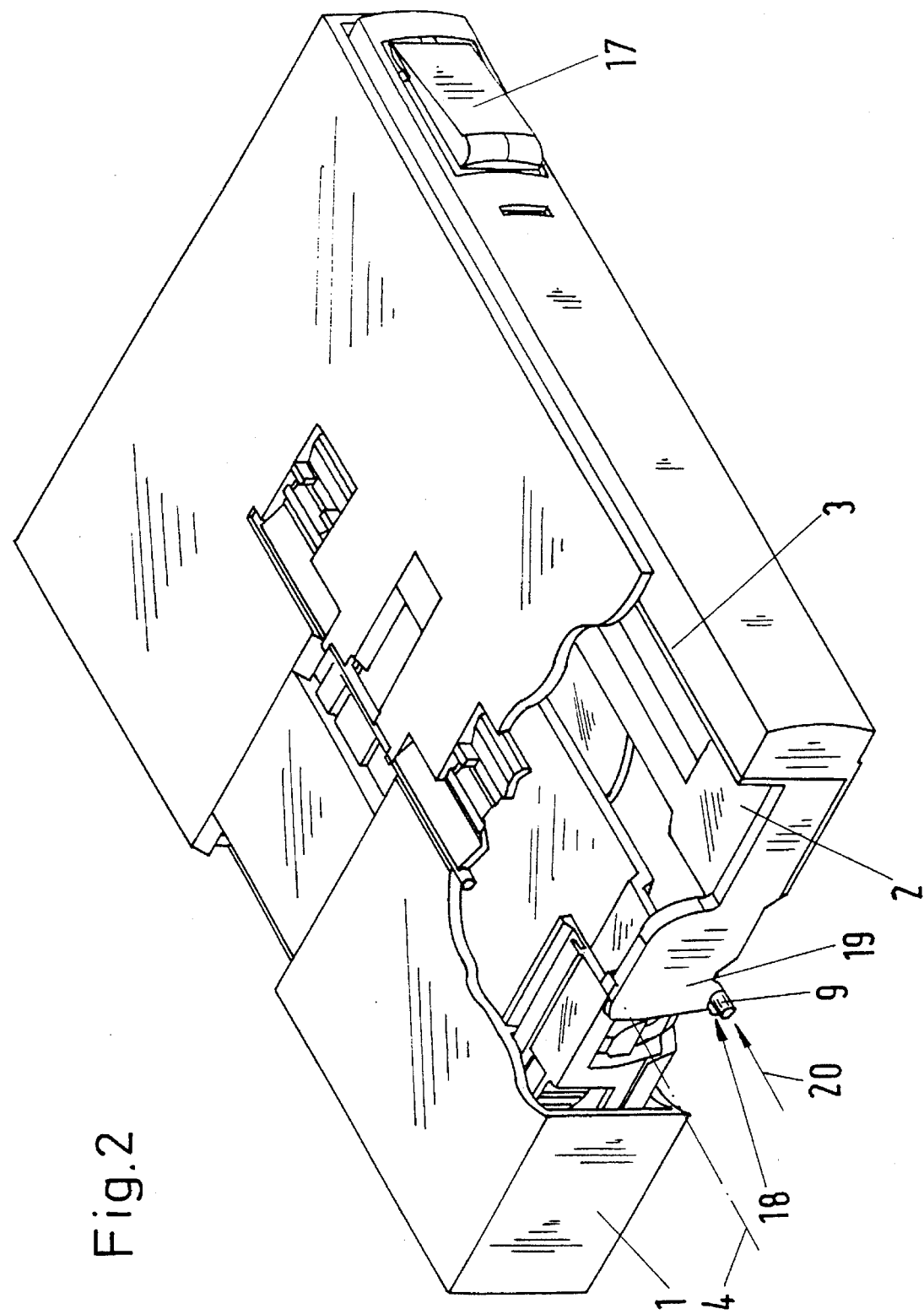
FIG. 2 is a perspective view of the container of FIG. 1 in which the slider is in the storage position.

In FIG. 2, the slider 2 is in the storage position in which it is fully inserted in the housing 1 and locked therein. By operating a button 17, the slider 2 can be unlocked so that it can be moved by the compression spring 15 into the removal position shown in FIG. 1.

The peg 9 has an inclined ramp face 18 and is arranged on a thin-walled resilient lateral carrier element 19 below the pivot axis 4. The resilient carrier element 19 can be pressed resiliently in the direction of arrow 20. The inclined ramp face 18 together with the carrier element 19 provide means for safeguarding the pivotable part 3 from excessive pressure and from damage resulting from that excessive pressure.

If the pivotable part 3 (FIG. 1) is accidentally pressed by hand further downwards when it is in the removal position, then the ramp face 18 causes the peg 9 and resilient carrier element 19 to yield inwards in the direction of arrow 20 until the peg 9 no longer engages in the guide cam 11 and also no longer presses against the stop 13.

Figure 3:
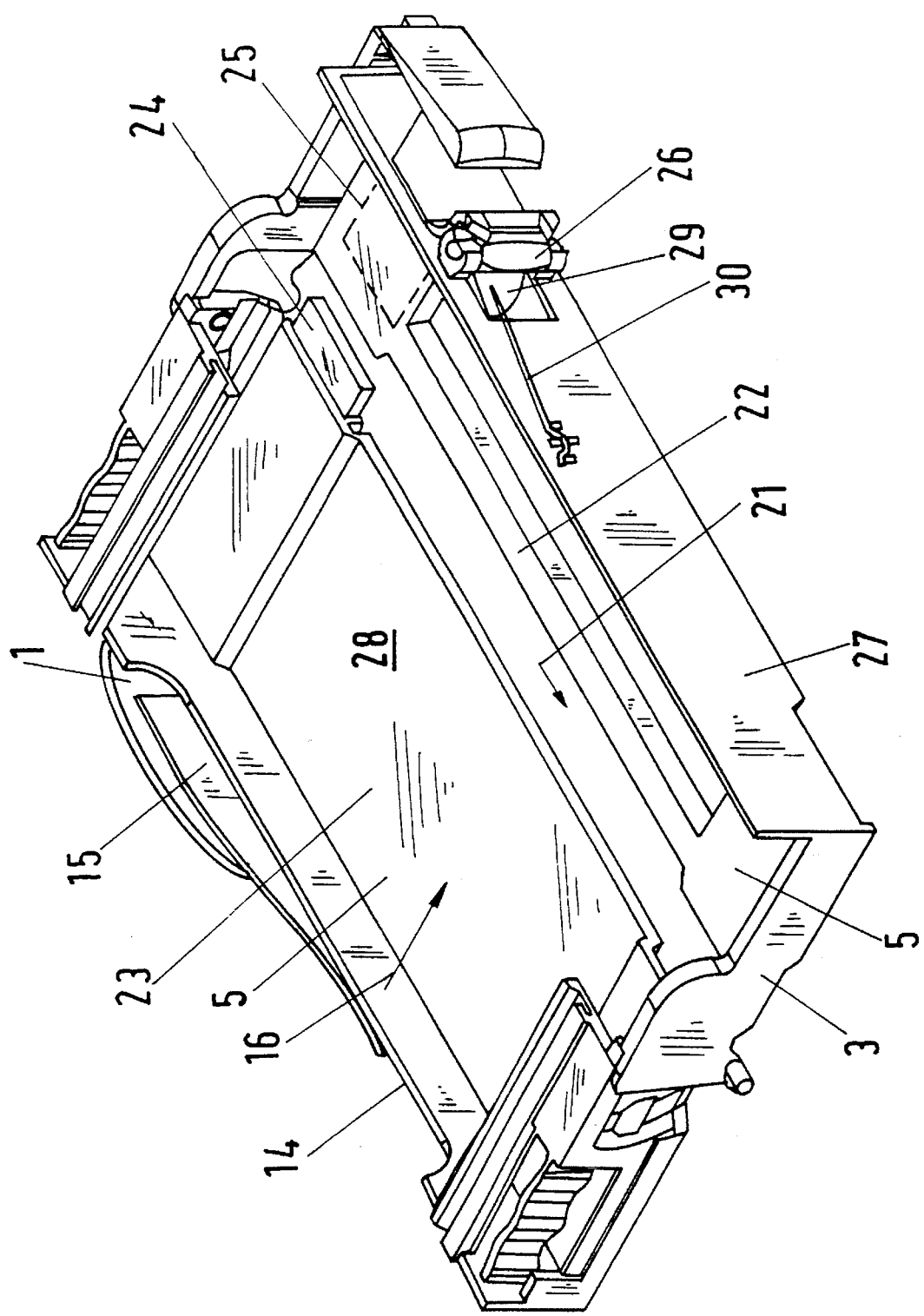
FIG. 3 is a perspective view of the slider of the container of FIG. 1.

FIG. 3 shows a gap 21 formed in the base plate 5 which divides the base plate 5 into a front part 22 and a rear part 23. A light guide 24 arranged on the housing projects into the gap 21 and conducts light to a light guide 25 arranged in the pivotable part 3. Light reaches a container-empty indicator 26 which is rotatable about a vertical axis and is arranged adjacent to the front panel 27 via the light guide 25. A rotating element 29, which is rotated against the spring force of a restoring spring 30 through about 45° when a magnetic tape cassette is inserted, projects from the container-empty indicator 26 into the receiving space 28. The rotation alters the position of a marking on the container empty indicator 26, which indicates whether or not there is a magnetic tape cassette on the slider.

FIG. 4 illustrates in particular a locking device for the tape hubs 32, 33, which has two locking elements 35, 36 arranged on a transverse axle 34. The transverse axle 34 is operated by way of a sliding mechanism 37 which engages by means of a driver element 38 against an enlargement 39 of an inserted magnetic tape cassette 6. By displacing the sliding mechanism 37 longitudinally in the direction of arrow 40, when the storage position is reached the transverse axle 34, with the locking elements 35, 36, is pivoted, so that the latter engage in the reel hubs 32, 33.

The preferred embodiment is illustrated in the drawings. However, instead of a transversely inserted magnetic tape cassette a structure with a longitudinally inserted magnetic tape cassette could also have the features according to the invention.

While the invention has been illustrated and embodied in an interchangeable externally mounted rearview mirror apparatus for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. A container for a magnetic tape cassette, said container comprising a housing (1) and a slider (2) having means for accommodating a magnetic tape cassette, said housing (1) having means (15) for partially displacing said slider from said housing (1) into a removal position of said slider (2) in which said magnetic tape cassette is removable from said slider (2) and means for locking said slider (2) in said housing in a storage position of said slider, said slider including a base plate (5) comprising a non-pivotable rear base plate (23) and a pivotable part (3) having a transverse pivot axis (4) arranged above and spaced from the base plate (5) and said slider (2) being provided with a gap (21) in the base plate (5) located between the pivotable part (3) and the non-pivotable rear base plate (23); and means (9,10; 15) for pivoting said pivotable part (3) downwardly about said transverse pivot axis (4) when said slider (2) is moved into said removal position;

wherein said means (9,10; 15) for pivoting said pivotable part (3) downwardly comprises a peg (9,10) projecting outwardly from the pivotable part (3) of the slider (2)

at least on one side of the pivotable part and a guide cam (11,12) formed laterally in at least one side of said housing (1), said guide cam (11,12) and said peg (9,10) being located so that said peg (9,10) engages in said guide cam and so that in the removal position of said slider the peg (9,10) of said pivotable part (3) is pressed on said housing (1) so as to pivot the pivotable part (3) downward.

2. A container as defined in claim 1, wherein said peg (9) is provided with means (18,19) for safeguarding against an excessive pressure on said peg (9), said means for safeguarding comprising an inclined ramp face (18) provided on said peg (9) and a resilient carrier element (19) from which said peg (9) projects, said resilient carrier element (19) being a lateral portion of said pivotable part (3) of said slider (2) and being positioned so as to be movable laterally inwardly.

3. A container, for a magnetic tape cassette, said container comprising a housing (1) and a slider (2) having means for accommodating a magnetic tape cassette, said housing (1) having means (15) for partially displacing said slider from said housing (1) into a removal position of said slider (2) in which said magnetic tape cassette is removable from said slider (2) and means for locking said slider (2) in said housing in a storage position of said slider, said slider including a base plate (5) comprising a non-pivotable rear base plate (23) and a pivotable part (3) having a transverse pivot axis (4) arranged above and spaced from the base plate (5) and said slider (2) being provided with a gap (21) in the base plate (5) located between the pivotable part (3) and the non-pivotable rear base plate (23); and means (9,10; 15) for pivoting said pivotable part (3) downwardly about said transverse pivot axis (4) when said slider (2) is moved into said removal position;

wherein the pivotable part (3) of the slider (2) has a front panel (27) and further comprising a first light guide (24) in the housing (1) and extending adjacent the slider (2) across the gap (21) in the base plate (5); a second light guide (25) in the pivotable part (3) of the slider (2), the first light guide (24) extending up to the second light guide (25); and a container-empty indicator (26) adjacent to the front panel (27), the second light guide (25) leading to the container-empty indicator (26).

4. A container as defined in claim 3, wherein the slider (2) has a receiving space (28) for receiving said magnetic tape cassette and the container-empty indicator (26) is provided with a visible marking and is rotatable about a vertical axis and comprises a rotatable element (29) projecting into said receiving space (28) of said slider and a restoring spring (30) connected to said rotatable element (29) so as to urge said rotatable element (29) into the receiving space (28) of the slider (2) and thus rotate the container-empty indicator (26).

5. A container as defined in claim 1, further comprising locking elements (35,36) pivotally mounted in the housing (1) so as to be engageable in tape hubs (32, 33) of said magnetic tape cassette (6) when said magnetic tape cassette (6) is on said slider (2) in said storage position to lock the tape hubs (32,33); a transverse axle (34) rotatably mounted transverse to the insertion direction of the magnetic tape cassette in the housing and to which said locking elements (35,36) are rigidly connected; a driver element (38) engageable with said transverse axle (34) for rotation of said transverse axle and with an enlargement (39) provided on the magnetic tape cassette (6) so that said transverse axle (34) is rotated when said slider (2) with said magnetic tape cassette accommodated thereon is inserted in said housing (1) so that said locking elements (35,36) lock said tape hubs.

\* \* \* \* \*